(12) United States Patent
Chen

(10) Patent No.: US 10,271,523 B2
(45) Date of Patent: *Apr. 30, 2019

(54) PET COLLAR WITH LATCH MOUNT

(71) Applicant: Dongguan Jiasheng Enterprise Co., Ltd., Dongguan (CN)

(72) Inventor: Silong Chen, Dongguan (CN)

(73) Assignee: Dongguan Jiasheng Enterprise Co., Ltd., Dongguan (CN)

( * ) Notice: Subject to any disclaimer, the term of this patent is extended or adjusted under 35 U.S.C. 154(b) by 11 days.

This patent is subject to a terminal disclaimer.

(21) Appl. No.: 15/695,460

(22) Filed: Sep. 5, 2017

(65) Prior Publication Data

US 2018/0343836 A1    Dec. 6, 2018

(30) Foreign Application Priority Data

Jun. 6, 2017   (CN) .......................... 2017 1 0417896

(51) Int. Cl.
*A01K 27/00* (2006.01)

(52) U.S. Cl.
CPC .......... *A01K 27/006* (2013.01); *A01K 27/001* (2013.01)

(58) Field of Classification Search
CPC .. A01K 11/008; A01K 11/006; A01K 27/001; A01K 27/002; A01K 27/006; A01K 27/009

See application file for complete search history.

(56) References Cited

U.S. PATENT DOCUMENTS

| | | | |
|---|---|---|---|
| 7,705,736 B1* | 4/2010 | Kedziora | A01K 11/008 340/573.3 |
| 2014/0331942 A1* | 11/2014 | Sarazyn | A01K 29/005 119/719 |
| 2015/0342149 A1* | 12/2015 | Lutz | A01K 27/006 119/859 |
| 2017/0135315 A1* | 5/2017 | Marmen | A01K 15/021 |
| 2017/0215386 A1* | 8/2017 | Pianelli | A01K 27/006 |
| 2017/0265432 A1* | 9/2017 | Anderton | G01S 5/02 |
| 2017/0372580 A1* | 12/2017 | Vivathana | G08B 21/0261 |
| 2018/0064068 A1* | 3/2018 | McKee | A01K 27/009 |
| 2018/0110205 A1* | 4/2018 | Czarnecky | A01K 15/021 |
| 2018/0132450 A1* | 5/2018 | Goetzl | A01K 27/009 |
| 2018/0153137 A1* | 6/2018 | Goetzl | A01K 15/022 |
| 2018/0153138 A1* | 6/2018 | Goetzl | A01K 15/022 |
| 2018/0303068 A1* | 10/2018 | Chen | A01K 27/002 |

* cited by examiner

*Primary Examiner* — Trinh T Nguyen
(74) *Attorney, Agent, or Firm* — Wang Law Firm, Inc.

(57) ABSTRACT

A pet collar with a latch mount includes a collar body in a ring shape and a hardware holder fixed and locked to the collar body. The hardware holder has a latching assembly and a connecting terminal child-and-mother seat; the collar body includes a flexible printed circuit component; the flexible printed circuit component has plural waterproof LED luminous bodies packaged by resin; the waterproof LED luminous body is connected to the connecting terminal child-and-mother seat of the hardware holder through the flexible printed circuit component. The invention has the features of powerful function, simple structure, and reasonable design and uses a hardware holder to achieve the effect of combining different hardware components to improve the environmental adaptability of the product, so as to meet the using requirements for different occasions and environments.

1 Claim, 4 Drawing Sheets

PET COLLAR WITH LATCH MOUNT

CROSS REFERENCE TO RELATED APPLICATION

This application claims priority to CN 201710417896.7, filed on Jun. 6, 2017 in the State Intellectual Property Office of the People's Republic of China, the entirety of which is incorporated by reference herein.

FIELD OF INVENTION

The present invention relates to a pet collar, in particular to the pet collar with a latch mount capable of installing a modular smart pet module.

BACKGROUND OF INVENTION

1. Description of the Related Art

In general, a pet collar is a device used for protecting, controlling, and guiding a pet, and its consumption is very large. Present pet collars just have simple functions and structure and no longer can meet the requirements of practical use. Specifically, relevant data indicate that more than six-million pets (including cats and dogs) were killed in car accidents last years in the United States, and most of the accidents occurred in the dark environment or the condition of insufficient light. In addition, numerous pets were missing or lost in various situations every years, and the chance of finding or getting back these missing or lost pets is very low due to lack of effective pet activity range controls and lost pet recovering measures.

Therefore, manufacturers of the related industry developed and provided a smart pet collar, but different people have different functional requirements of the smart pet collar, and the smart pet collar with all functions incurs a high cost, and the high-cost pet collar is not necessarily applicable for to meeting the using requirements of different user groups. The conventional pet collar is designed as the whole piece. In other words, the collar and related smart devices are fixed altogether as a whole and cannot be detached quickly, and the hardware cannot be upgraded easily when needed.

2. Summary of the Invention

Therefore, it is a primary objective of the present invention to overcome the aforementioned deficiency of the prior art by providing a pet collar with a latch mount capable of installing a smart device.

To achieve the aforementioned and other objectives, the present invention provides a pet collar with a latch mount comprising: a collar body and a hardware holder, characterized in that the collar body is substantially ring shaped; the hardware holder is fixed and locked to the collar body; the hardware holder has a latching assembly and a connecting terminal child-and-mother seat; the collar body includes a flexible printed circuit component; the flexible printed circuit component has a plurality of waterproof LED luminous bodies attached thereon and packaged by a resin; the waterproof LED luminous bodies are coupled to the connecting terminal child-and-mother seat of the hardware holder through the flexible printed circuit component; the flexible printed circuit component includes a strip flexible substrate, an electrically conductive metal layer printed onto the strip flexible substrate for sealing a thin film layer, and an end of the strip flexible substrate has a round hole, and the round hole is used as the center for attaching a ring shaped structural reinforcing plate made of a hard material, and an LED positive electrode circuit contact, an LED negative electrode circuit contact, an antenna contact, and a grounding contact are installed around the round hole by using the round hole as the center; the electrically conductive metal layer is comprised of a plurality of non-contact sections, and one of the non-contact sections is coupled to the LED positive electrode circuit contact, and one of the non-contact sections is coupled to the LED negative electrode contact, and one of the non-contact sections is coupled to the antenna contact, and one of the non-contact sections is coupled to the grounding contact.

Further, the bottom of the hardware holder has a honeycomb reinforced structure.

Further, the LED luminous body is a monochromatic lamp bead or a multi-color lamp bead.

Further, the ring shaped structural reinforcing plate has a mating hole formed thereon and provided for connection.

Further, the flexible printed circuit component has a structural reinforcing plate installed at the backside of a position of the LED luminous body, and the structural reinforcing plate is provided for preventing the flexible printed circuit component, the LED luminous body and the flexible printed circuit component from falling out or being separated with each other when the flexible printed circuit component is bent or deformed by a force.

The present invention has the features of powerful function, simple structure, and reasonable design and uses a hardware holder to achieve the effect of combining different hardware components to improve the environmental adaptability of the product, so as to meet the using requirements for different occasions and environments.

DESCRIPTION OF THE PREFERRED EMBODIMENTS

The above and other objects, features and advantages of this disclosure will become apparent from the following detailed description taken with the accompanying drawings.

Figure 1:
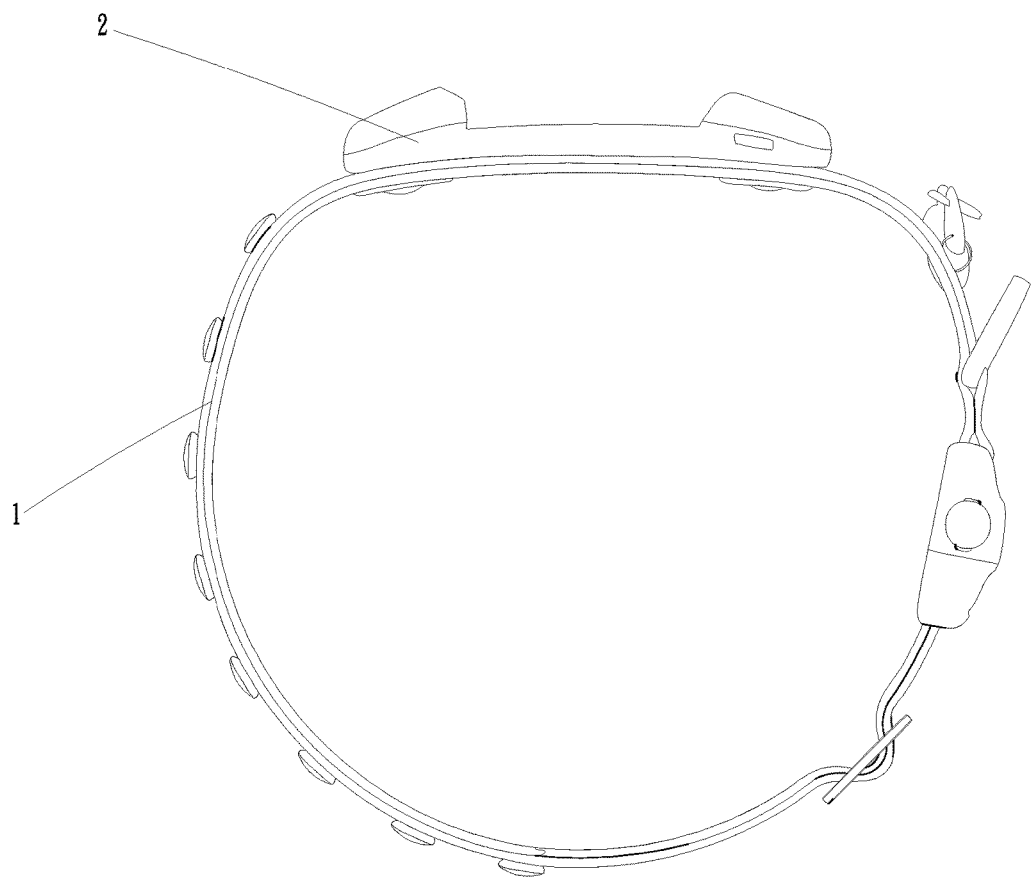
FIG. 1 is a schematic view of a pet collar with a latch mount in accordance with a preferred embodiment of the present invention.
Figure 2:
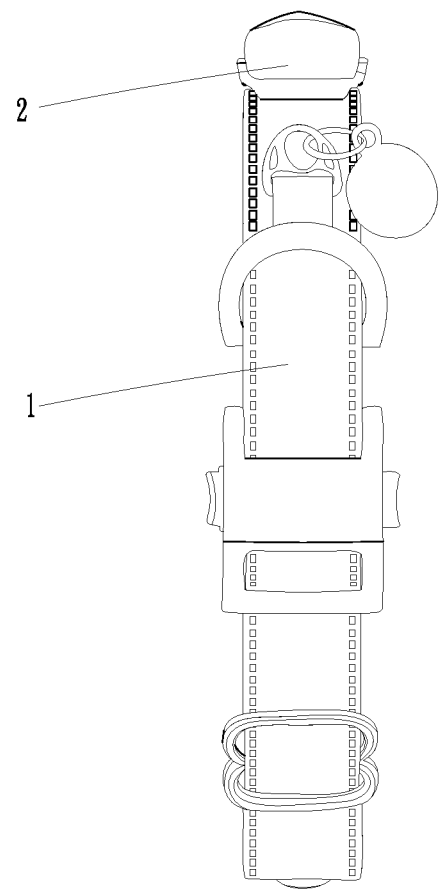
FIG. 2 is another schematic view of a pet collar with a latch mount in accordance with a preferred embodiment of the present invention.
Figure 3:
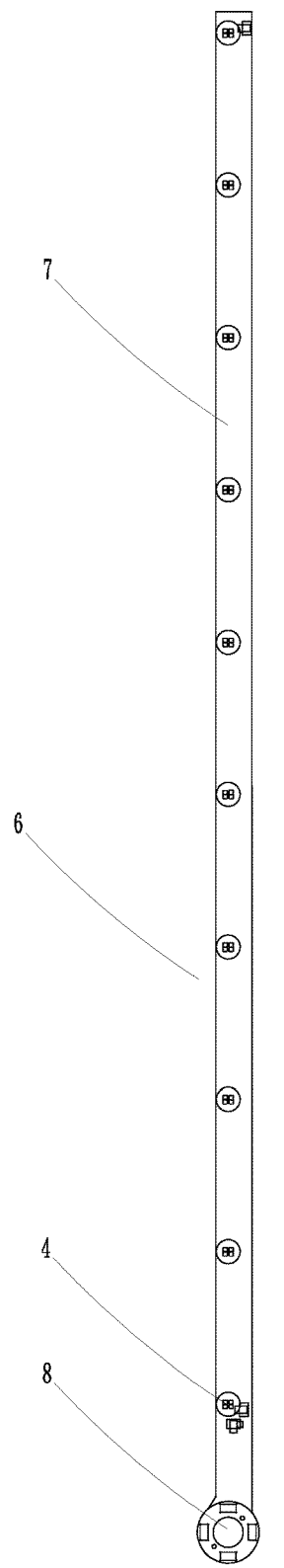
FIG. 3 is a schematic view of a a flexible printed circuit component and an LED luminous body assembled with each other in accordance with the present invention.
Figure 4:
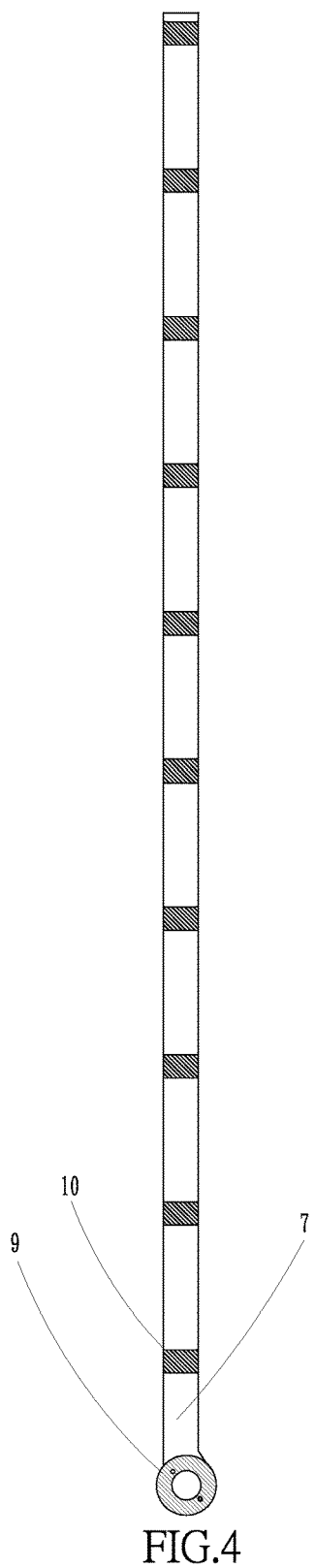
FIG. 4 is a schematic view showing the backside of a flexible printed circuit component.

With reference to FIGS. 1 to 4 for a pet collar with a latch mount in accordance with the present invention, the pet collar comprises a collar body 1 and a hardware holder 2, characterized in that the collar body 1 is substantially ring shaped, and the hardware holder 2 is fixed and locked to the collar body 1; the hardware holder 2 has a latching assembly disposed thereon and a connecting terminal child-and-mother seat disposed therein; the collar body 1 includes a flexible printed circuit component 6; the flexible printed circuit component 6 has a plurality of waterproof LED luminous bodies 4 attached thereon and packaged by a resin; the waterproof LED luminous bodies 4 are coupled to the connecting terminal child-and-mother seat of the hardware holder 2 through the flexible printed circuit component 6; the flexible printed circuit component 6 includes a strip flexible substrate 7, an electrically conductive metal layer printed onto the strip flexible substrate 7, a thin film layer for sealing the electrically conductive metal layer, and a round hole 8 formed at an end of the strip flexible substrate 7, and used as the center for attaching a ring shaped structural reinforcing plate 9 made of a hard material, wherein an LED positive electrode circuit contact, an LED negative electrode circuit contact, an antenna contact, and a grounding contact are disposed around the round hole 8 by using the round hole 8 as the center; the electrically conductive metal layer is comprised of a plurality of non-contact sections, and one of the non-contact sections is coupled to the LED positive electrode circuit contact, and one of the non-contact sections is coupled to the LED negative electrode contact, and one of the non-contact sections is coupled to the antenna contact, and one of the non-contact sections is coupled to the grounding contact. The bottom of the hardware holder 2 has a honeycomb reinforced structure. The LED luminous body 4 is a monochromatic lamp bead. The ring shaped structural reinforcing plate 9 has a mating hole formed thereon and provided for connection. The flexible printed circuit component 6 has a structural reinforcing plate 10, installed at the backside of a position of the LED luminous body 4, and the structural reinforcing plate 10 is provided for preventing the flexible printed circuit component 6, the ED luminous body 4, and the flexible printed circuit component 6 from falling out or being separated from each other when the flexible printed circuit component 6 is bent or deformed.

While the invention has been described by means of specific embodiments, numerous modifications and variations could be made thereto by those skilled in the art without departing from the scope and spirit of the invention set forth in the claims.

What is claimed is:

1. A pet collar with a latch mount, comprising: a collar body and a hardware holder, characterized in that the collar body is substantially ring shaped; the hardware holder is fixed and locked to the collar body; the hardware holder has a latching assembly and a connecting terminal child-and-mother seat; the collar body includes a flexible printed circuit component; the flexible printed circuit component has a plurality of waterproof LED luminous bodies attached thereon and packaged by a resin; the waterproof LED luminous bodies are coupled to the connecting terminal child-and-mother seat of the hardware holder through the flexible printed circuit component; the flexible printed circuit component includes a strip flexible substrate, an electrically conductive metal layer printed onto the strip flexible substrate for sealing a thin film layer, and an end of the strip flexible substrate has a round hole, and the round hole is used as the center for attaching a ring shaped structural reinforcing plate made of a hard material, and an LED positive electrode circuit contact, an LED negative electrode circuit contact, an antenna contact, and a grounding contact are installed around the round hole by using the round hole as the center; the electrically conductive metal layer is comprised of a plurality of non-contact sections, and one of the non-contact sections is coupled to the LED positive electrode circuit contact, and one of the non-contact sections is coupled to the LED negative electrode contact, and one of the non-contact sections is coupled to the antenna contact, and one of the non-contact sections is coupled to the grounding contact; the bottom of the hardware holder has a honeycomb reinforced structure; the LED luminous body is a monochromatic lamp bead or a multi-color lamp bead; the ring shaped structural reinforcing plate has a mating hole formed thereon and provided for connection; the flexible printed circuit component has a structural reinforcing plate installed at the backside of a position of the LED luminous body, and the structural reinforcing plate is provided for preventing the flexible printed circuit component, the LED luminous body, and the flexible printed circuit component from falling out or being separated from each other when the flexible printed circuit component is bent or deformed by a force.

* * * * *